(12) United States Patent
Tzruya et al.

(10) Patent No.: US 7,596,540 B2
(45) Date of Patent: Sep. 29, 2009

(54) SYSTEM, METHOD AND COMPUTER PROGRAM PRODUCT FOR DYNAMICALLY ENHANCING AN APPLICATION EXECUTING ON A COMPUTING DEVICE

(75) Inventors: Yoav Tzruya, Even Yehuda (IL); Ohad Sheory, Yehud (IL); Uri Twig, Petach Tikva (IL)

(73) Assignee: Exent Technologies, Ltd., Petach-Tikva (IL)

( * ) Notice: Subject to any disclaimer, the term of this patent is extended or adjusted under 35 U.S.C. 154(b) by 671 days.

(21) Appl. No.: 11/290,830

(22) Filed: Dec. 1, 2005

(65) Prior Publication Data

US 2007/0130292 A1 Jun. 7, 2007

(51) Int. Cl.
*G06N 5/02* (2006.01)
(52) U.S. Cl. .............................. 706/47; 706/45; 706/46; 715/200; 715/205; 715/700; 715/701; 715/702; 715/710; 715/716; 715/738; 715/760; 715/826
(58) Field of Classification Search .................. 706/14, 706/18, 45–47; 709/217–219, 224–226, 709/230–232; 715/200, 205–208, 700–702, 715/710, 716, 733, 738, 739, 745, 747–749, 715/760, 825, 826, 860
See application file for complete search history.

(56) References Cited

U.S. PATENT DOCUMENTS

| | | | |
|---|---|---|---|
| 5,905,492 A | | 5/1999 | Straub et al. |
| 5,991,836 A | * | 11/1999 | Renda ......................... 710/58 |
| 6,021,438 A | | 2/2000 | Duvvoori et al. |
| 6,036,601 A | | 3/2000 | Heckel |

(Continued)

FOREIGN PATENT DOCUMENTS

WO    9924904 A1    5/1999

(Continued)

OTHER PUBLICATIONS

Mohr, et al., "HijackGL: Reconstructing from Streams for Stylized Rendering", Association for Computing Machinery, Inc., (Jun. 3, 2002), pp. 13-20.

(Continued)

*Primary Examiner*—David R Vincent
*Assistant Examiner*—Omar F Fernandez Rivas
(74) *Attorney, Agent, or Firm*—Fiala & Weaver, PLLC

(57) ABSTRACT

A system, method and computer program product for dynamically enhancing a software application, such as a video game, executing on a computing device, without having to change and recompile the original application code. The system includes a staging environment that monitors the execution of the application and indexes each item of graphical and/or audio information generated by the application into a first database. A system administrator or other entity then populates a second database by manual or automated means with one or more business rules, wherein each business rule is associated with one or more of the objects indexed in the first database. The system further includes a run-time environment that identifies items of graphics and/or audio information as they are generated by the application during run-time, uses the second database to determine if an identified item is associated with a business rule, and, responsive to a determination that an identified item is associated with a business rule, applies the business rule.

45 Claims, 8 Drawing Sheets

U.S. PATENT DOCUMENTS

| | | | |
|---|---|---|---|
| 6,163,317 | A | 12/2000 | de Judicibus |
| 6,278,966 | B1 * | 8/2001 | Howard et al. ............... 703/23 |
| 6,311,221 | B1 * | 10/2001 | Raz et al. .................. 709/231 |
| 6,330,711 | B1 | 12/2001 | Knutson |
| 6,616,533 | B1 | 9/2003 | Rashkovskiy |
| 6,785,659 | B1 * | 8/2004 | Landsman et al. ........... 705/14 |
| 6,868,525 | B1 | 3/2005 | Szabo |
| 6,907,566 | B1 * | 6/2005 | McElfresh et al. ......... 715/210 |
| 7,120,619 | B2 | 10/2006 | Drucker et al. |
| 7,246,254 | B2 | 7/2007 | Alur et al. |
| 2002/0002568 | A1 * | 1/2002 | Judson ...................... 707/513 |
| 2002/0147858 | A1 | 10/2002 | Motoyama et al. |
| 2002/0154214 | A1 | 10/2002 | Scallie et al. |
| 2002/0178302 | A1 | 11/2002 | Tracey |
| 2003/0131286 | A1 | 7/2003 | Kaler et al. |
| 2003/0167202 | A1 | 9/2003 | Marks et al. |
| 2003/0208754 | A1 * | 11/2003 | Sridhar et al. ................ 725/34 |
| 2004/0083133 | A1 * | 4/2004 | Nicholas et al. .............. 705/14 |
| 2004/0122940 | A1 | 6/2004 | Gibson et al. |
| 2004/0133876 | A1 * | 7/2004 | Sproule ..................... 717/105 |
| 2004/0148221 | A1 | 7/2004 | Chu |
| 2004/0189671 | A1 | 9/2004 | Masne |
| 2004/0217987 | A1 | 11/2004 | Aran |
| 2005/0015641 | A1 | 1/2005 | Alur et al. |
| 2005/0246174 | A1 * | 11/2005 | DeGolia .................... 704/270 |
| 2006/0128469 | A1 | 6/2006 | Willis et al. |
| 2006/0143675 | A1 | 6/2006 | Willis et al. |
| 2007/0006190 | A1 * | 1/2007 | Surasinghe ................ 717/143 |
| 2007/0061201 | A1 | 3/2007 | Ellis et al. |
| 2007/0072676 | A1 | 3/2007 | Baluja |
| 2007/0126749 | A1 | 6/2007 | Tzruya et al. |
| 2007/0129146 | A1 | 6/2007 | Tzruya et al. |
| 2007/0129990 | A1 | 6/2007 | Tzruya et al. |
| 2007/0168309 | A1 | 7/2007 | Tzruya et al. |
| 2007/0296718 | A1 | 12/2007 | Tzruya et al. |

FOREIGN PATENT DOCUMENTS

| | | |
|---|---|---|
| WO | 0029964 A1 | 5/2000 |
| WO | 2005096782 A2 | 10/2005 |
| WO | 2007063422 A3 | 6/2007 |
| WO | 2007148233 A2 | 12/2007 |
| WO | 2007148233 A3 | 12/2007 |
| WO | 2008020313 A2 | 2/2008 |
| WO | 2008020313 A3 | 2/2008 |
| WO | 2008020317 A2 | 2/2008 |
| WO | 2008020317 A3 | 2/2008 |
| WO | 2008104834 A2 | 9/2008 |

OTHER PUBLICATIONS

Walders, H., "glAnalyze—The Newest OpenGL Product", http://www.3dsite.com/n/sites/3dsite/newsletter/issues/10/sec12.html, retrieved Apr. 15, 2002, (Apr. 29, 1999), pp. 1-3.

"New In-Game Advertising Solution from Exent Technologies Provides Dramatic Increase in Ad Inventory Without Technical Integration", http://www.exent.com/news/pr/20060427.asp, retrieved Mar. 14, 2008, (Apr. 27, 2006), pp. 1-2.

"Exent Technologies: In-Game Advertising", http://web.archive.org/web/20060504072829/http://exent.com/products_and_services/In_Game_Advertising.asp, retrieved Mar. 14, 2008, (May 4, 2006), 1 page.

Chalil, M. et al., "MPEG-4 Based Framework for Game Engine to Handle Virtual Advertisements in Games", International Conference on Multimedia and Expo, (Jul. 6, 2003), 413-416.

* cited by examiner

Run-Time Environment 106

SYSTEM, METHOD AND COMPUTER PROGRAM PRODUCT FOR DYNAMICALLY ENHANCING AN APPLICATION EXECUTING ON A COMPUTING DEVICE

BACKGROUND OF THE INVENTION

1. Field of the Invention

The present invention generally relates to software applications. In particular, the present invention relates to techniques for dynamically enhancing software applications during execution on a computing device.

2. Background

Software applications, and video games in particular, render graphics information to a display device using a variety of techniques. One well-known technique is to place function calls to a low-level application programming interface (API) such as DirectX® or OpenGL®. In response to receiving such function calls, these APIs issue commands to the graphics hardware of a computer system or, in the alternative, attempt to emulate relevant hardware functionality in software. Similarly, software applications may play audio information by placing function calls to DirectSound®, which is an API within the DirectX® suite of APIs.

It is of interest to various parties that make such applications available to end-users (for example, publishers, retailers and service providers) to augment some of the graphics and audio information rendered by these applications based on a dynamic set of "business rules". For example, such business rules could be used to display advertising content on a graphics element rendered by a video game or to insert advertising content within an audio stream played by the video game. Ideally, the dynamic nature of the business rules would allow them to be periodically changed. For example, it would be advantageous if the inserted advertising content could be changed on a periodic basis.

One possible method of achieving this is to embed the business rules directly in the original application logic, or "source code", and then to recompile the application with those business rules. However, this technique of coding and recompiling an application to accommodate the business rules might not be achievable for all software applications. By way of example, the party wishing to insert the business rule might not have access to the source code. As another example, the application that is sought to be enhanced may already have been deployed in the field or purchased by consumers or others.

Another method of achieving the dynamic insertion of graphics content into an application is to integrate special client software into the original application logic during the software development phase of the application. When the application is executed, the special client software serves the application to communicate with a server, which, based upon some predefined business rules, may dynamically insert graphics content into the application in a pre-allocated space that has been identified and registered in advance by the application. However, this method is limiting because it will only work if the application as originally programmed includes the necessary special client software, interfaced during development time, and has identified in advance the areas on which the dynamically-inserted graphics information may appear.

What is desired then is a system, method and computer program product for dynamically enhancing an application, such as a video game, executing on a computing device, without having to change and recompile the original application code. Dynamically enhancing the application should include the ability to dynamically modify graphics and/or audio information generated by the application during execution, to dynamically render additional graphics and/or audio information during execution of the application, or to perform other functions relating to the executing application that are not provided for or invoked by the source code of the application.

BRIEF SUMMARY OF THE INVENTION

The present invention provides a system, method and computer program product for dynamically enhancing an application, such as a video game, executing on a computing device, without having to change and recompile the original application code. In one implementation, dynamically enhancing the application includes the ability to dynamically modify graphics and/or audio information generate by the application during execution. In another implementation, dynamically enhancing the application includes the rendering of additional graphics and/or audio content during execution of the application. In still other implementations, dynamically enhancing the application includes the performance of other functions relating to the executing application that are not provided for or invoked by the source code of the application.

In one implementation, a system in accordance with an embodiment of the present invention includes a staging environment that monitors the execution of the application and indexes each item of graphics and/or audio information generated by the application into a first database. A system administrator or other entity then populates a second database by manual or automated means with one or more business rules, wherein each business rule is associated with one or more of the items indexed in the first database. The system further includes a run-time environment that identifies items of graphics and/or audio information as they are generated by the application during run-time, uses the second database to determine if an identified item is associated with a business rule, and, responsive to a determination that an identified item is associated with a business rule, applies the business rule. Application of the business rule may result in the modification of graphics and/or audio information generated by the application during execution, the rendering of additional graphics and/or audio information, or the performance of other functions relating to the executing application that are not provided or invoked by the source code of the application.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 11:
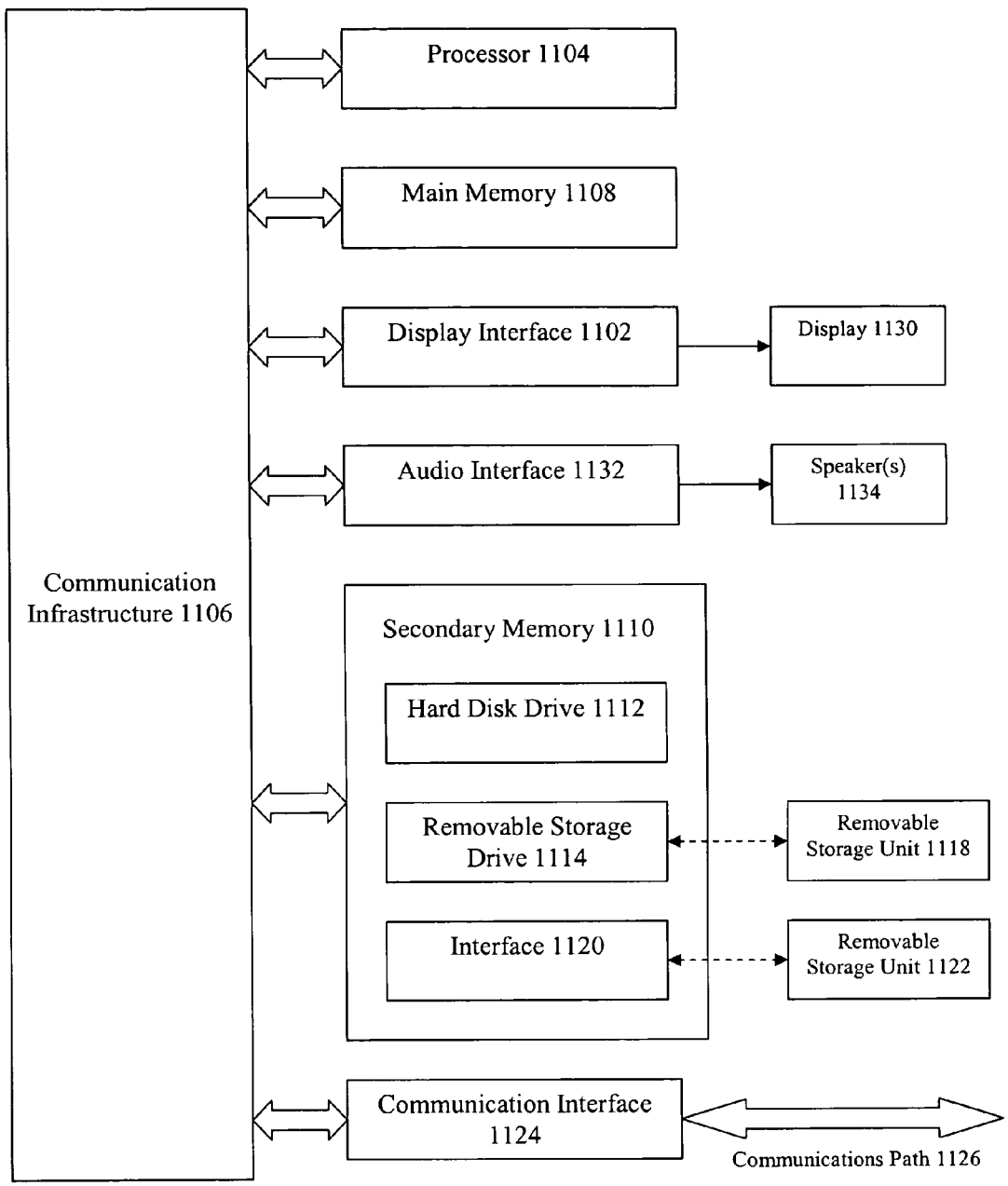

FIG. 11 depicts an example computer system that may be utilized to implement a computing device in accordance with an implementation of the present invention The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

Figure 1:
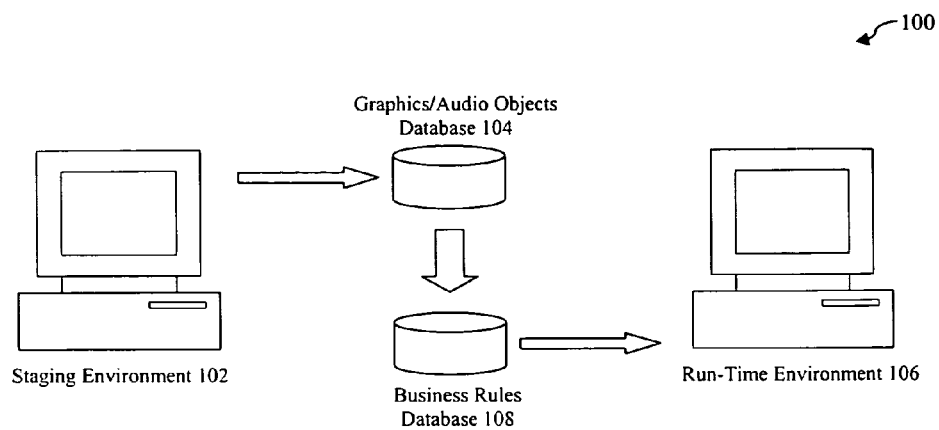
FIG. 1 illustrates the physical components of a system that facilitates the dynamic enhancement of an application executing on a computing device in accordance with an embodiment of the present invention.

I. System for Dynamically Enhancing a Software Application Executing on a Computing Device FIG. 1 illustrates the hardware components of an exemplary system 100 that facilitates the dynamic enhancement of an application executing on a computing device in accordance with an embodiment of the present invention. As shown in FIG. 1, system 100 includes both a staging environment 102 and a run-time environment 106. Staging environment 102 performs processing steps that must occur to facilitate operations that will later be performed by run-time environment 106. In particular, and as will be explained in more detail herein, staging environment 102 monitors a software application, such as a video game, during execution on a computing device, identifies graphics and audio objects generated by the application, and indexes each of these objects in a graphics/audio objects database 104 along with a unique identifier (ID). Ideally, this process need only be carried out once per software application.

As will be described in more detail herein, after graphics/audio objects database 104 has been populated by staging environment 102, a system administrator or other entity then populates a business rules database 108 by manual or automated means with a set of "business rules", wherein each business rule in database 108 is associated with one or more of unique IDs of objects indexed in graphics/audio objects database 104.

Run-time environment 106 represents the environment in which an end-user actually runs the application software. The application is the "same" as the application executed in staging environment 102 in that it is another copy or instance of essentially the same computer program, although it need not be completely identical. As will be described in more detail herein, run-time environment 106 monitors the execution of the application on a computing device and also identifies application-generated graphics and audio objects. If run-time environment 106 determines that an object generated by the application matches a business rule associated with the above-mentioned object in business rules database 108, then it applies the business rule. The business rule may be used, for example, to determine whether or not to modify the object in run-time (i.e., during execution of the software application) although other business rules will also be described herein.

In terms of hardware components, each of staging environment 102 and run-time environment 106 consists of a computing device that is configured to execute software applications that generate graphics and audio information. Each computing device further includes application program interfaces for rendering and displaying the application-generated graphics information and for playing back the application-generated audio information. For the sake of convenience, from this point forward, each of staging environment 102 and run-time environment 106 will be described as comprising a personal computer (PC) based computer system, although the invention is not so limited. For example, staging environment 102 and run-time environment 106 may each comprise a server, a console, a personal digital assistant (PDA), or any other computing device that is capable of executing software applications and displaying associated application-generated graphics and audio information to an end-user.

Figure 2:
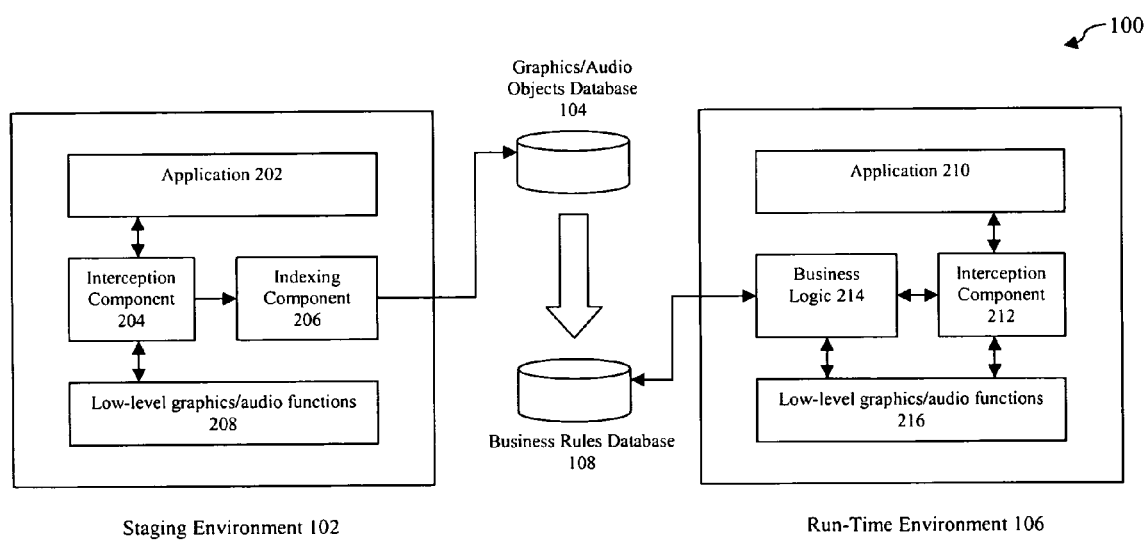
FIG. 2 illustrates the software components of a system that facilitates the dynamic enhancement of an application executing on a computing device in accordance with an embodiment of the present invention.

FIG. 2 illustrates the software components of system 100. As shown in FIG. 2, staging environment 102 includes an application 202, an interception component 204, an indexing component 206, and low-level graphics/audio functions 208. Application 202 is a software application, such as a video game, that is executed within staging environment 102. Low-level graphics/audio functions 208 are software functions resident in memory of the computer system that are accessible to application 202 and that assist application 202 in the rendering of application-generated graphics information and the playing of application-generated audio information. In an embodiment, low-level graphics/audio functions 208 comprise one or more functions within a low-level application program interface (API) such as DirectX® or OpenGL®.

Application 202 is programmed such that, during execution, it makes function calls to low-level graphics/audio functions 208. The interaction of application 202 with low-level graphics/audio functions 208 is well-known in the art. However, in accordance with an embodiment of the present invention, such function calls are intercepted by interception component 204 and provided to an indexing component 206 prior to being passed to low-level graphics/audio functions 208. Interception component 204 and indexing component 206 are software components that are installed on the computer system of staging environment 102 prior to execution of application 202. As will be described in more detail herein, indexing component 206 identifies graphics and audio objects associated with the intercepted function calls and indexes each of the objects in graphics/audio objects database 104 along with a unique ID.

In an implementation of the present invention, interception component 204 comprises one or more emulated versions of corresponding low-level graphics/audio functions 208. For example, in an implementation in which low-level graphics/audio functions 208 are contained in graphics and audio libraries (such as in dynamic link libraries, or DLLs), interception component 204 comprises emulated versions of one or more of those libraries. These emulated libraries have the same names as the original libraries that they are intended to replace so that they are linked to application 202 at run-time. A particular example of interception by emulation will now be explained with reference to FIGS. 3 and 4.

Figure 3:
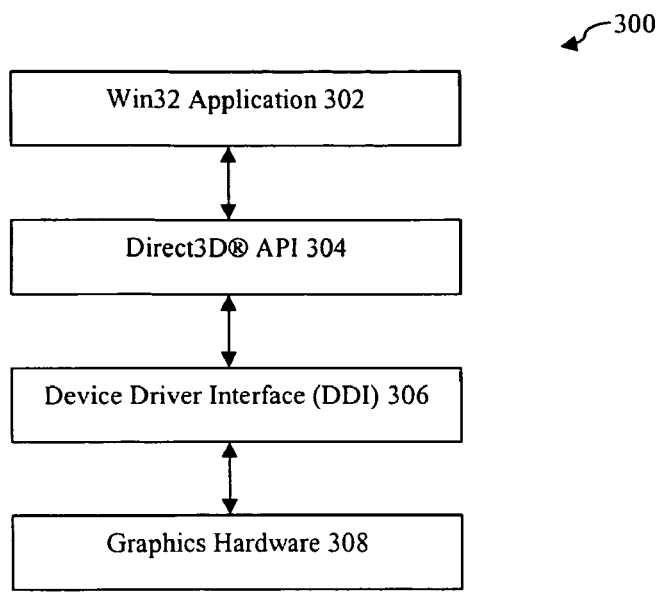
FIG. 3 illustrates a conventional software architecture for a Microsoft® Windows® based PC that utilizes graphics libraries.

FIG. 3 illustrates a conventional software architecture 300 for a Microsoft® Windows® based PC. As shown in FIG. 3, software architecture 300 includes a 32-bit Microsoft® Windows® application 302 executing on the PC. During execution, application 302 makes function calls to a Direct3D® API 304 in a well-known manner. As will be appreciated by persons skilled in the relevant art(s), Direct3D® API 304 comprises a series of libraries that are resident in PC memory and accessible to application 302 and that include functions that may be called by application 302 for rendering and displaying graphics information. In response to receiving the function calls from application 302, Direct3D® API 304 determines if such functions can be executed by graphics hardware 308 within the PC. If so, Direct3D® API 304 issues commands to a device driver interface (DDI) 306 for graphics hardware 308. DDI 306 then processes the commands for handling by graphics hardware 308.

Figure 4:
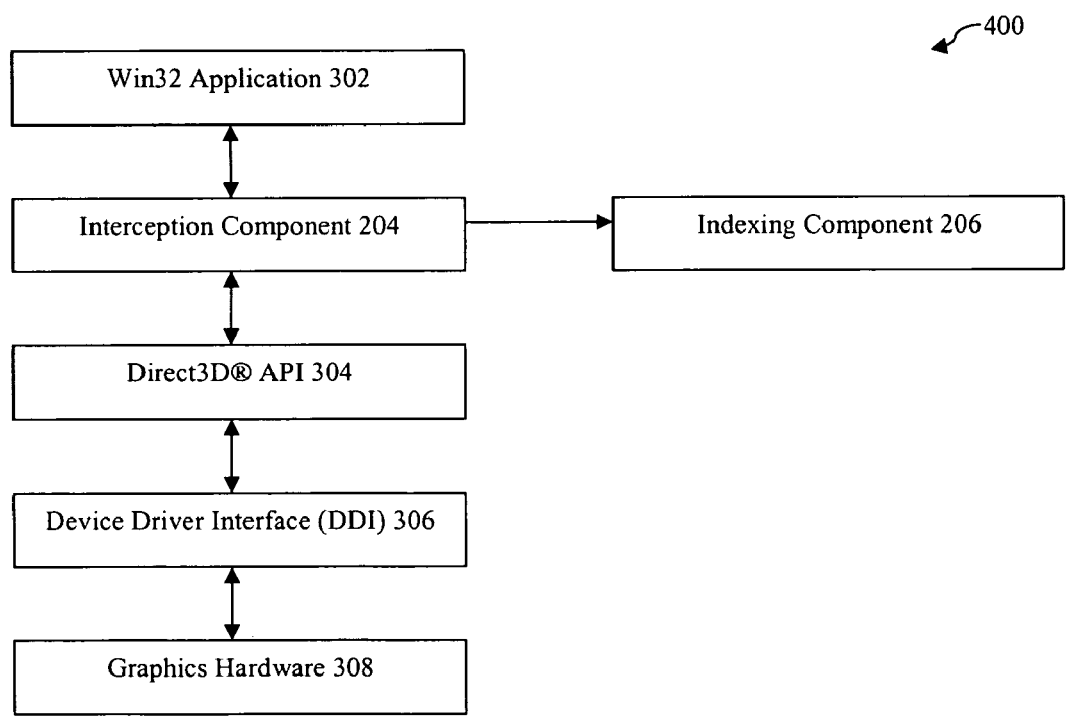
FIG. 4 illustrates a software architecture of a staging environment that includes emulated graphics and audio libraries, comprising components for indexing graphics and audio objects, in accordance with an embodiment of the present invention.

In contrast to the conventional software architecture illustrated in FIG. 3, FIG. 4 illustrates a software architecture including emulated graphics and audio libraries in accordance with an embodiment of the present invention. As shown in FIG. 4, interception component 204 has been inserted between application 302 and Direct3D® API 304. This may be achieved by emulating one or more graphics or audio libraries within Direct3D® API 304. As a result, certain function calls generated by application 302 are received by interception component 204 rather than Direct3D® API 304. Interception component 204 provides the intercepted function calls, or graphics and audio objects associated with the intercepted function calls, to an indexing component 206. Interception component 204 also passes the function calls to Direct3D® API 304 by placing calls to that API, where they are handled in a conventional manner. It is noted, however, that the function calls need not necessarily be passed to Direct3D® API 304 in order to practice the invention.

Depending on the operating system, emulating a genuine graphics API can be achieved in various ways. One method for emulating a genuine graphics API is file replacement. For example, since both DirectX® and OpenGL® are dynamically loaded from a file, emulation can be achieved by simply replacing the pertinent file (OpenGL.dll for OpenGL® and d3dX.dll for DirectX®, where X is the DirectX® version). Alternatively, the DLL can be replaced with a stub DLL having a similar interface, which implements a pass-through call to the original DLL for all functions but the hook functions.

Another method that may be used is to intercept or "hook" function calls to the API using the Detours hooking library published by Microsoft® of Redmond, Wash. Hooking may also be implemented at the kernel level. Kernel hooking may include the use of an operating system (OS) ready hook to enable a notification routine for an API being called. Another technique is to replace the OS routines by changing the pointer in the OS API table to a hook routine pointer, chaining the call to the original OS routine before and/or after the hook logic execution. Another possible method is API-based hooking technique the performs the injection of a DLL to any process that is being loaded, by setting a system global hook or by setting a registry key to load such a DLL. This injection is done only to have the hook function running in the process address space. While the OS loads such a DLL, a DLL initialization code changes the desired DLL dispatch table. Changing the table causes the pointer to the original API implementation to point to the DLL implementation (only to the desired API) and thus hooking the API. Hooking techniques are described, for example, at the web page http://www.codeguru.com/system/apihook.html. Note that the above described hooking techniques are presented only by way of example, and are not meant to limit the invention to any of these techniques. Other tools and methods for intercepting function calls to graphics or audio APIs are known to persons skilled in the relevant art(s).

As further shown in FIG. 2, run-time environment 106 includes an application 210, an interception component 212, business logic 214, and low-level graphics/audio functions 216. Application 210 is the "same" as application 202 of staging environment 102 in that it is another copy or instance of essentially the same computer program, although it need not be completely identical. Low-level graphics/audio functions 216 are software functions resident in memory of the computer system that are accessible to application 210 and that assist application 210 in the rendering of application-generated graphics information and the playing of application-generated audio information. Low-level graphics/audio functions 208 and 216 are similar in the sense that they provide the same functionality and services to application 202 and application 210, respectively, through similar APIs.

During execution on the computer system of run-time environment 106, application 210 makes function calls to low-level graphics/audio functions 216 in the same well-known manner that application 202 made function calls to low-level graphics/audio functions 208 in staging environment 102. However, in accordance with an embodiment of the present invention, such function calls are intercepted by interception component 212, which either passes the function call on to low-level graphics/audio functions 216, on to business logic 214, or both. Interception component 212 and business logic 214 are software components that are installed on the computer system of run-time environment 106 prior to execution of application 210.

When interception component 212 intercepts a function call, it passes control, along with the relevant object, to business logic 214, which determines if the object is associated with one or more business rules in database 108. If the object is associated with a business rule in database 108, then business logic 214 applies the business rule.

In one implementation, application of the business rule results in modification of the object (which may include lighting sources, point of view, textures, or shading) during run-time. If no modification is to occur, the intercepted function call is simply passed on to low-level graphics/audio functions 216. If a modification is to occur then the function call may be handled by business logic 214 alone or by business logic 214 in conjunction with low-level graphics/audio functions 216. As will be described in more detail herein, modifying the object may include altering a portion of the object, replacing the object with a different object, or simply not rendering or playing back the object. The application of other business rules will also be described herein.

Figure 5:
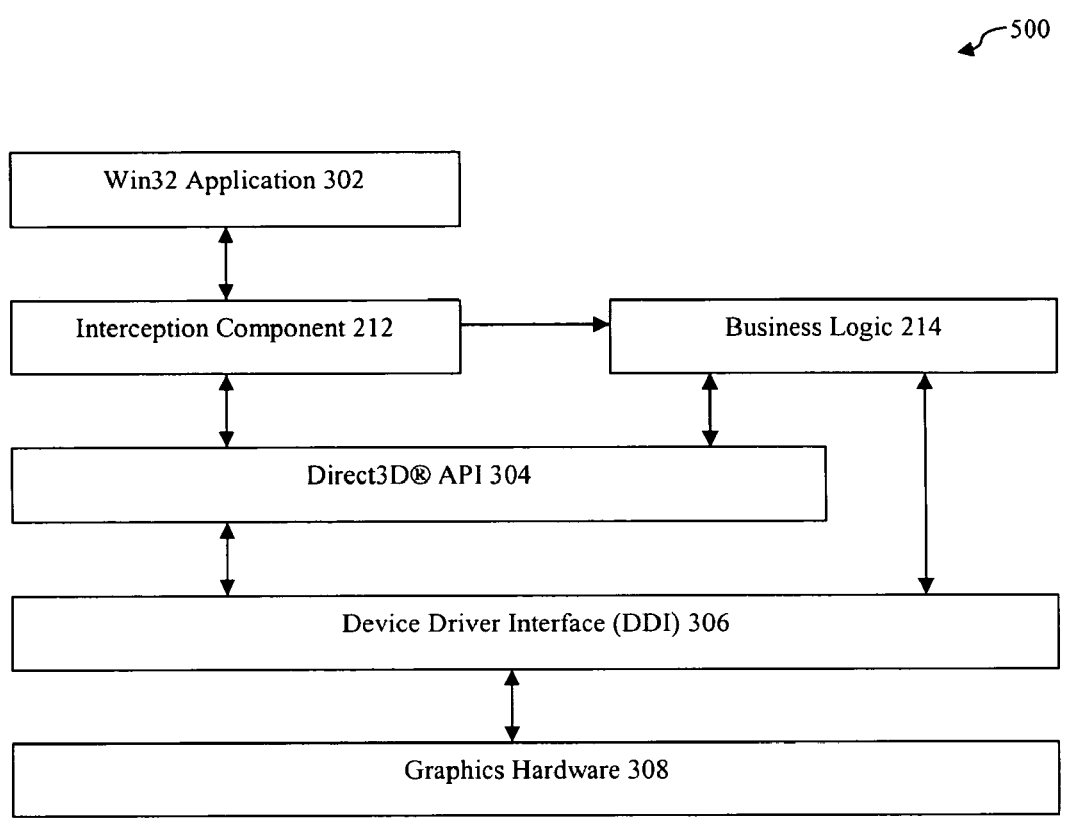
FIG. 5 illustrates a software architecture of a run-time environment that includes emulated graphics and audio libraries, comprising components that identify graphics and audio objects and apply business rules associated with the identified objects, in accordance with an embodiment of the present invention.

FIG. 5 illustrates an example software architecture for run-time environment 106 in which interception component 212 is implemented by way of emulation. As shown in FIG. 5, interception component 212 has been inserted between a Windows application 302 and a Direct3D® API 304. Like the software architecture described above with reference to FIG. 4, this is achieved by emulating one or more graphics or audio libraries within Direct3D® API 304. As a result, certain function calls generated by application 302 are received by interception component 212 rather than Direct3D® API 304. As also shown in FIG. 5, in an implementation, both interception component 212 and business logic 214 can place function calls to Direct3D® API 304 and business logic 214 can send commands directly to DDI 506. Whether or not business logic 214 has this capability depends upon the nature of the business rules being applied.

In one implementation, graphics/audio objects database 104 is created or populated in local memory of the computer system of staging environment 102. A system administrator or other entity then populates business rules database 108 by manual or automated means with one or more business rules, wherein each business rule is associated with one or more of the objects indexed in the first database. The association between the business rule and an object is created by forming a relationship between the business rule and the unique ID of the object in database 108. In one implementation, a "wild card" scheme is used to permit a single business rule to be associated with a group of logically-related objects.

Generally speaking, a business rule is any logic that, when applied within the context of application 210, causes application 210 to perform a function that is not provided for in the original application source code. As noted above, a business rule may call for modification of a graphics object associated with an intercepted function call such that the graphics object, when rendered, appears differently than it would have if it were not so modified. For example, a business rule may cause advertising content to be dynamically inserted into a graphics object. Further examples of business rules and their application are set forth below in Section IV. However, these examples are provided for illustrative purposes only and are not intended to limit the present invention.

Because the business rules can be changed at any time by a system administrator or other entity, they provide a dynamic mechanism by which to enhance application 210. For example, the business rules provided a dynamic mechanism by which to augment graphics and audio content generated by that application.

In one implementation, once business rules database 108 has been created or updated by a system administrator or other entity, a copy of database 108 is transferred to local memory of the computer system of run-time environment 106. The transfer may occur by transferring a copy of database 108 to a recordable computer useable medium, such as a magnetic or optical disc, and then transferring the computer useable medium to run-time environment 106. Alternatively, a copy of database 108 may be transferred via a data communication network, such as a local area and/or wide area data communication network. In yet another implementation, database 108 is not transferred to local memory of the computer system of run-time environment 106 at all, but is instead stored at a central location in a computing network, where it can be accessed by multiple run-time environments 106 using well-known network access protocols. However, these examples are not intended to be limiting and persons skilled in the relevant art(s) will appreciate that a wide variety of methods may be used to make database 108 available to run-time environment 106.

Figure 6:
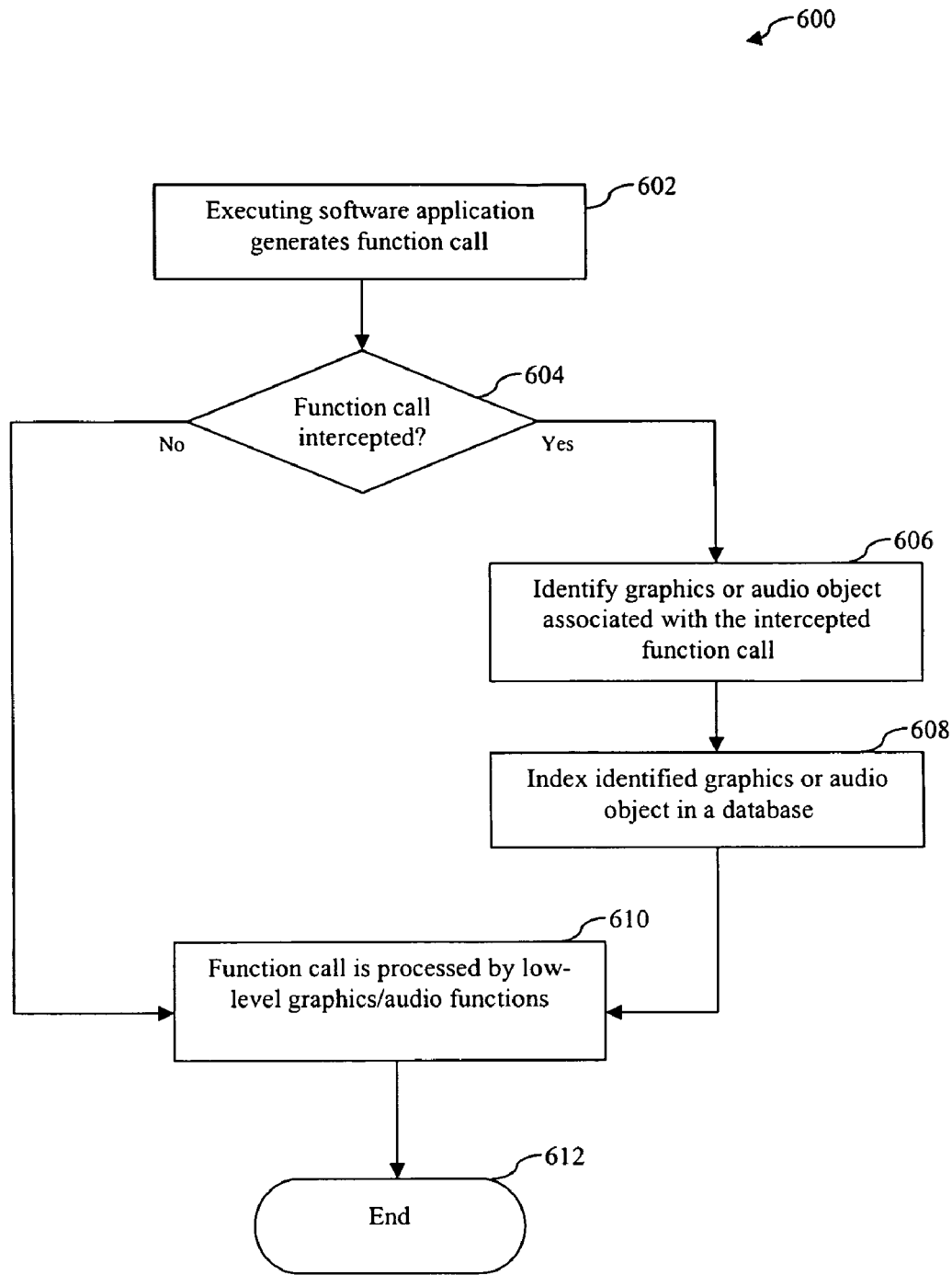
FIG. 6 illustrates a flowchart of a method used in a staging environment for facilitating the dynamic enhancement of an application executing on a computing device in accordance with an embodiment of the present invention.

II. Method for Dynamically Enhancing a Software Application Executing on a Computing Device FIG. 6 illustrates a flowchart 600 of a method for facilitating the dynamic enhancement of an application executing on a computing device in accordance with an embodiment of the present invention. FIG. 6 essentially describes the processing steps carried out by staging environment 102 with respect to the handling of a single graphics or audio function call generated by a single software application. Persons skilled in the relevant art(s) will readily appreciate that a software application will likely generate numerous such function calls, and thus that the method of flowchart 600 would likely be carried out numerous times during execution of the software application. The method will now be described in part with continued reference to certain software components illustrated in FIG. 2 and described above in reference to that figure. However, persons skilled in the relevant art(s) will appreciate that the method of flowchart 600 is not limited to that implementation.

The following description of the method of flowchart 600 assumes that each of the software components of staging environment 102 have already been installed on a computer system. The method also assumes that software application 202 is executing on the computer system. Executing software application 202 encompasses both launching the application and interacting with the application through one or more user interfaces in a manner that causes the application to generate graphic and/or audio information. For example, if application 202 is a video game, executing the application encompasses both launching the video game and playing through at least a portion of the video game using appropriate user input/output (I/O) devices.

The method begins at step 602, in which software application 202 generates a function call directed to low-level graphics/audio functions 208. At step 604, it is determined whether or not the function call is intercepted by interception component 204. If no interception occurs, then processing proceeds to step 610, where the function call is handled by low-level graphics/audio functions 208 in a conventional manner. Processing of the function call then ends as indicated at step 612. However, if the function call has been intercepted, processing instead proceeds to step 606.

At step 606, interception component 204 identifies a graphics or audio object associated with the intercepted function call. A graphics object may comprise a model, texture, image, parameter, or any other discrete set of graphics information associated with the intercepted function call and used in rendering a graphics information on behalf of application 202. An audio object may comprise an audio file, a digital sound wave, or any other discrete set of audio information associated with the intercepted function call and used in playing back audio information on behalf of application 202. The graphics or audio object may be part of the function call itself or may be addressed by or pointed to by the function call. For example, if the intercepted function call is a SetTexture function call to the Direct3D® API, the associated graphics object may consist of a texture pointed to by the SetTexture function call.

At step 608, indexing component 206 indexes the graphics or audio object identified in step 606 in graphics/audio objects database 104. In one implementation, indexing the object includes storing the object, or a portion thereof, in graphics/audio objects database 104 along with a unique identifier (ID) for the object. The unique ID may be arbitrarily assigned or may be calculated based on information contained in the object itself. For example, in an implementation, the unique ID comprises an error correction code, such as a cyclic redundancy code (CRC), that is calculated based on all or a portion of the content of the graphics or audio object. In an alternate implementation, an encryption and/or hashing algorithm is applied to all or a portion of the content of the graphics or audio object to generate the unique ID. For example, the unique ID may be an MD5 hash signature that is calculated based on all or a portion of the content of the graphics or audio object. A benefit of generating a unique ID based on the content of the object itself is realized in run-time environment 106, where the unique ID instead of the object itself (which may be quite large), can be used to search for matches in business rules database 108. In one implementation of the present invention, the unique ID alone is stored in business rules database 108 to represent an underlying graphics or audio object. As a result, the storage requirements for business rules database 108 can be substantially reduced.

In one implementation, the unique ID is not calculated as part of the method of flowchart 600 but instead is calculated by a separate process that occurs after completion of the method when graphics/audio objects database 104 has been populated with graphics and audio objects.

At step 610, after indexing is complete, the function call is then passed to low-level graphics/audio functions 208, where it is handled in a conventional manner. After this, processing of the function call ends as indicated at step 612.

As noted above, the method of flowchart 600 would likely be executed numerous times during execution of a software application within staging environment 102. Furthermore, the method may be applied to the execution of multiple software applications in order to index graphics and audio objects therefrom. The indexed graphics and audio objects for the multiple applications may be stored in a single graphics/audio objects database 104 or in multiple databases 104. Each of these databases may then be used to populate one or more business rules databases 108, which are provided for use in one or more run-time environments 106.

Figure 7:
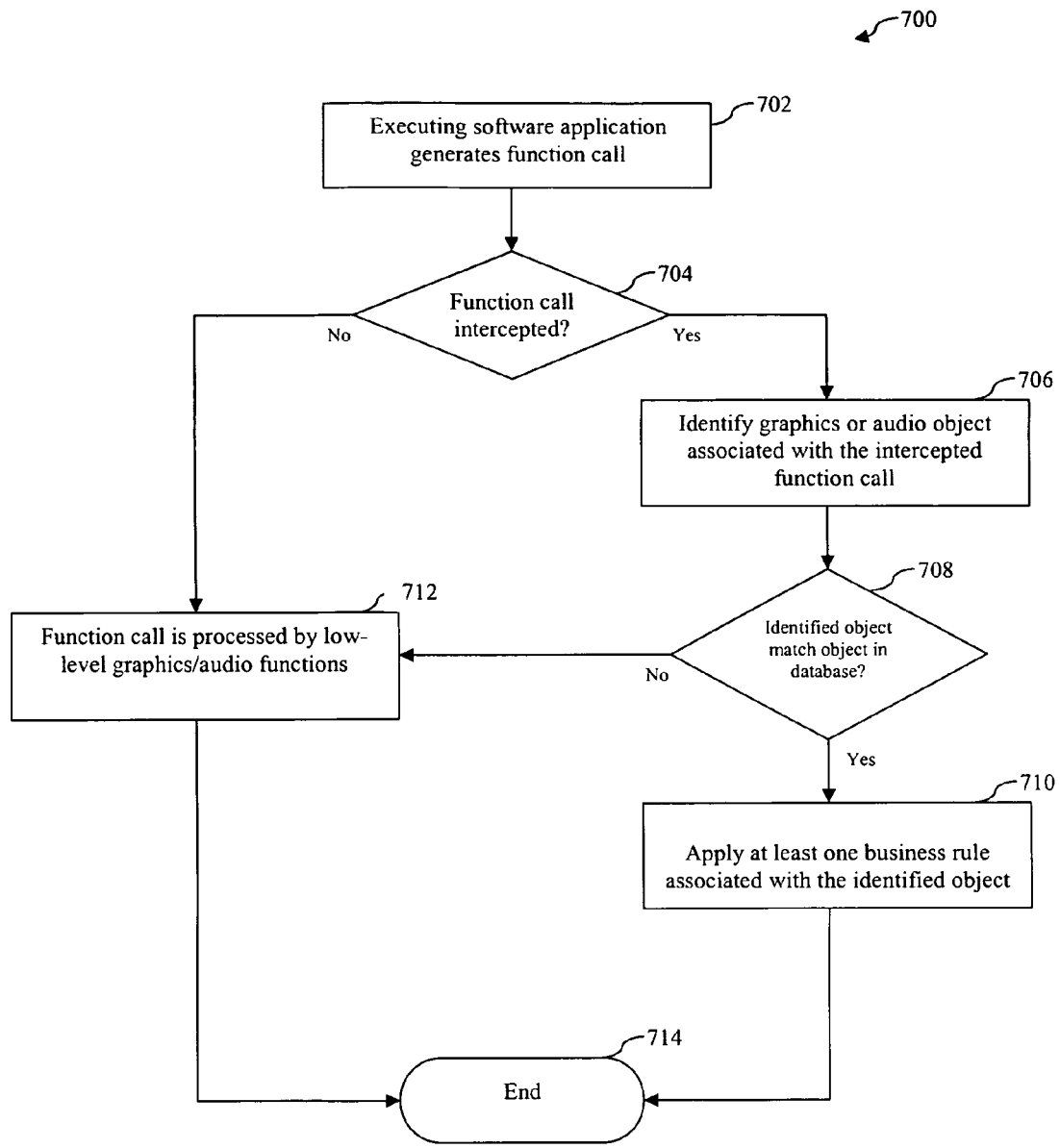
FIG. 7 illustrates a flowchart of a method used in a run-time environment for dynamically enhancing an application executing on a computing device in accordance with an embodiment of the present invention.

FIG. 7 illustrates a flowchart 700 of a method for dynamically enhancing an application executing on a computing device in accordance with an embodiment of the present invention. FIG. 7 essentially describes the processing steps carried out by run-time environment 106 with respect to the handling of a single graphics or audio function call generated by a single software application. Persons skilled in the relevant art(s) will readily appreciate that a software application will likely generate numerous such function calls, and thus that the method of flowchart 700 would likely be carried out numerous times during execution of the software application. The method will now be described in part with continued reference to certain software components illustrated in FIG. 2 and described above in reference to that figure. However, persons skilled in the relevant art(s) will appreciate that the method of flowchart 700 is not limited to that implementation.

The following description of the method of flowchart 700 assumes that each of the software components of run-time environment 106 have already been installed on a computer system. The method also assumes that software application 210 is executing on the computer system. Executing software application 210 encompasses both launching the application and interacting with the application through one or more user interfaces in a manner that causes the application to generate graphic and/or audio information.

The method begins at step 702, in which software application 210 generates a function call directed to low-level graphics/audio functions 216. At step 704, it is determined whether or not the function call is intercepted by interception component. If no interception occurs, then processing proceeds to step 712, where the function call is handled by low-level graphics/audio functions 216 in a conventional manner. Processing of the function call then ends as indicated at step 714. However, if the function call has been intercepted, processing instead proceeds to step 706.

At step 706, interception component 212 identifies a graphics or audio object associated with the intercepted function call. As noted above, a graphics object may comprise a model, texture, image, parameter, or any other discrete set of graphics information associated with the intercepted function call and an audio object may comprise an audio file, a digital sound wave, or any other discrete set of audio information associated with the intercepted function call. The graphics or audio object may be part of the function call itself or may be addressed by or pointed to by the function call. For example, if the intercepted function call is a SetTexture function call to the Direct3D® API, the associated graphics object may consist of a texture pointed to by the SetTexture function call.

At step 708, business logic 214 determines if the identified object is associated with at least one business rule in business rule database 108. This step may include comparing the identified object, or a portion thereof, to a graphics or audio object, or portion thereof, stored in database 108. Alternatively, this step may include calculating a unique ID for the identified object and then comparing the unique ID for the identified object to a set of unique IDs stored in database 108. For example, as described above in reference to FIG. 6, the unique ID may comprise an error correction code, such as a CRC, calculated based on all or a portion of the content of the identified object, or a signature, such as an MD5 hash signature, derived by applying an encryption and/or hashing algorithm to all or a portion of the content of the identified object. It should be noted that "wild cards" or other logical groupings of objects may be used in accordance with the present invention to associate a business rule with multiple objects. For example, business rules database 108 may include business rules that will be applied to all objects identified by a catch-all matching expression.

If the identified object is not associated with at least one business rule in database 108, then processing proceeds step 712 where the function call is processed by low-level graphics/audio functions 216 in a conventional manner.

However, if the identified object is associated with at least one business rule in database 108, then business logic 214 applies the at least one business rule as shown at step 710. In one implementation, the application of the business rule results in the modification of the identified object. Such modification may include replacing the identified object with a different object, altering the content of the identified object, or simply not rendering or playing the identified object at all. However, the present invention is not limited to simply modifying the object. For example, a business rule may include preceding the rendering or playing of the object with the rendering or playing of another object or succeeding the rendering or playing of the object with the rendering or playing of another object. Note that because application of the business rule may include rendering or playing an object, such application may include placing one or more function calls to low-level graphics/audio functions 216.

In fact, the business rule need not include the rendering of any graphics information or playing of any audio information. Instead the business rule may simply consist of performing some activity within the context of software application 210 in response to the identification of a certain graphics or audio object by interception component 212. By way of example, the business rule may include moving pointers associated with user input devices to predefined regions of the display screen (useful for auto-aiming in shooting games or for automatic orientation within on-screen game menus), generating a key sequence (such as inputting "cheat codes"), logging and/or reporting a user's progress within the software application, or other activities. Each of these events can be performed before, instead of, or after the graphics or audio object associated with an intercepted function call has been rendered or played by the original non-emulated low-level graphics or audio libraries.

After one or more business rules have been applied at step 710, processing of the function call then ends as shown at step 712.

III. Distribution/Installation of Software Components to Run-Time Environment As described above, an embodiment of the present invention facilitates the application of business rules to a software application executing on a computing device, thereby permitting the application to be enhanced in a dynamic manner that does not require modifying and recompiling the original application code. Additionally, because an embodiment of the invention can be implemented in run-time environment 106 using emulated libraries, the operation can be essentially transparent to the end user. Indeed, aside from the installation of the necessary software components (i.e., interception component 212, business logic 214, and optionally business rules database 108) in run-time environment 106, the end user need not take any proactive steps to link or interface the software application with an external software component.

Figure 8:
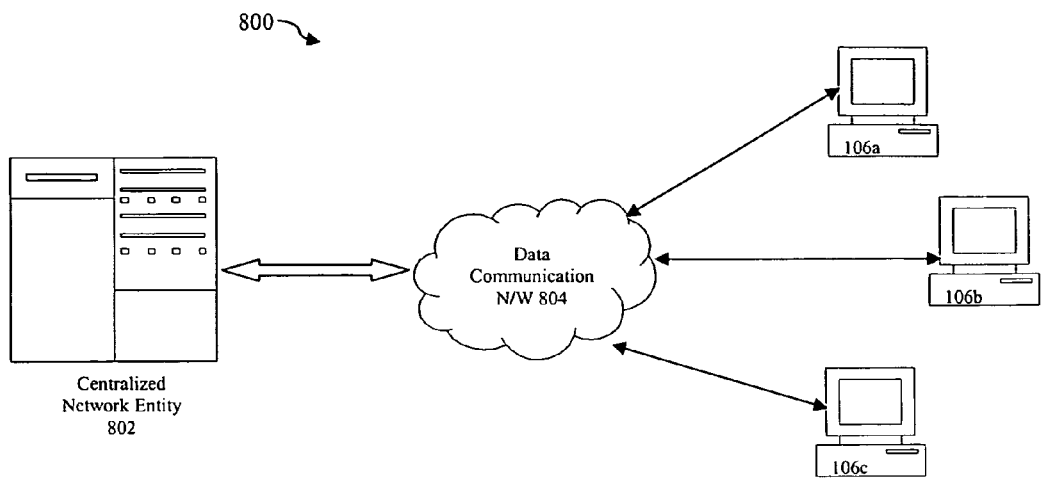
FIG. 8 illustrates a network system for distributing and/or accessing software components in accordance with an embodiment of the present invention.

The distribution of the necessary software components to the computing device of an end user may be achieved in a variety of ways. For example, the software components may be distributed from a centralized entity to a number of run-time environments over a data communication network, such as the Internet. Such a system is illustrated in FIG. 8, in which a centralized network entity 802 is shown communicating with a plurality of user run-time environments 106a, 106b and 106c over a data communication network 804. By combining such network-based distribution with auto-installation software, the installation of such components on an end-user's computing device may be achieved in a manner that advantageously requires minimal end user intervention. Furthermore, since only a single copy of the run-time components is needed on the end user machine, one can also bundle those components with one or more applications 210, In an implementation of the present invention, the business rules themselves are dynamic in the sense that an entity (for example, a publisher, retailer or service provider) can change them periodically to enhance a given application in different ways. Business rules can be changed or added by making modifications to business rules database 108. Copies of business rules database 108 or updates thereto may be distributed from a centralized network entity to multiple run-time environments 106 over a data communication network using a network system such as that shown in FIG. 8.

In an alternate implementation, copies of business rules database 108 are not distributed to run-time environments 106 at all but instead, business rules database 108 resides remotely with respect to run-time environments 106 and is accessed only when required via a data communication network, such as the Internet. For example, business logic rules database 108 may reside on a centralized network entity, such as a server, where it is accessed by computing devices associated with multiple run-time environments 106. Again, such a network configuration is illustrated in FIG. 8. This implementation is advantageous in that changes to the business rules need only be implemented once at the central server and need not be actively distributed to the multiple run-time environments 106.

In an implementation where interception component 212 comprises one or more emulated libraries, a determination may be made during installation of interception component 212 or at application run-time as to which libraries should be emulated. Consequently, different sets of libraries may be emulated for each software application that is to be dynamically enhanced. The determination may be based on the characteristics of the software application that is to be dynamically enhanced, upon some externally-provided metadata, or provisioned from the staging environment by one means or another.

IV. Example Applications of the Present Invention

Some exemplary applications of the present application will now be described. These examples are provided for illustrative purposes only and are not intended to limit the present invention in any way.

A. Embedding of In-Game Advertising

An implementation of the present invention facilitates the embedding of in-game advertising in games that were not designed to support such a feature. In accordance with this implementation, staging environment 102 operates to index the texture of a game-related surface, such as the hood of a car in a racing game, in graphics/audio objects database 104. A system administrator then defines a business rule to overlay the hood of the car with a logo associated with an advertised product. That business rule is captured in business rules database 108 where it is associated with the texture for the hood of the car. In run-time environment 106, interception component 212 identifies the texture as it is accessed for rendering on an end-user's computer and business logic 214 matches it to the business rule stored in database 108. As a result, the business rule is applied to augment the image of the texture for the car hood with the product logo and to render the manipulated image to the screen. The end result is that the product logo will be displayed upon the car hood "inside" the graphic display associated with the game.

Based on the teachings provided herein, persons skilled in the relevant art(s) will appreciate that the present invention is equally applicable to the insertion of audio advertising content within an audio object played within the context of a game. Furthermore, the present invention is also applicable to render graphic and audio advertising content that bears no relation to any specific intercepted object and that is rendered or played independently of that object.

Figure 9:
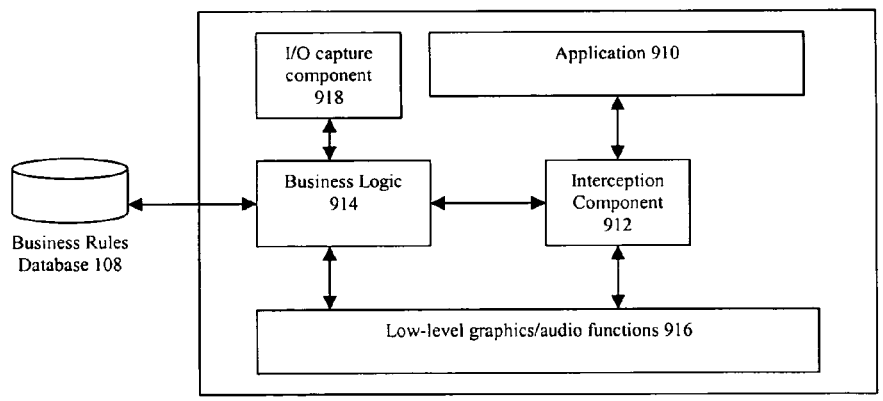
FIG. 9 illustrates an implementation of a run-time environment in accordance with the present invention that includes functionality for capturing input/output from an end user device and applying business rules based on a captured function call and a possible identification of an object.

In a further embodiment of the present invention, run-time environment 106 further includes logic for capturing input/output (I/O) from an end user device, such as a keyboard or mouse. The software components for such an embodiment are shown in FIG. 9. In particular, as shown in FIG. 9, the software components of run-time environment 106 include an application 910, low-level graphics/audio functions 916, and an interception component 912 "inserted" between them that is in communication with business logic 914, similar to the software architecture shown in FIG. 2. However, in the implementation shown in FIG. 9, an additional I/O capture component 918 has been provided that allows business logic 914 to monitor events associated with the use of a user input device such as a keyboard or mouse. In one implementation, this monitoring is achieved by emulating functions associated with processing mouse or keyboard input.

A system in accordance with FIG. 9 can be used to extend the functionality of an implementation of the present invention that facilitates the embedding of in-game advertising. For example, while an embedded product logo is being rendered within a graphic display associated with the game, I/O component 918 monitors user input to identify when a user has interacted with the logo, for example by pointing to the logo with a mouse and clicking. In response to a determination that user interaction has occurred, business logic 914 performs a function. By way of example, the function may include displaying a form for the user to enter data to be sent to a server, display some other graphic or audio content to the user, or provide the user with a prize or a notification that they will receive a prize.

B. Identifying Advancement and Achievements Within a Game

In accordance with an implementation of the present invention, level advancement and achievements with a game can be identified and certain actions can be taken based on the advancement or achievement. For example, a business rule can be associated with a graphics or audio object identified in staging environment 102 that is unique to or representative of a certain level or stage within a game that is divided into levels or stages. When the same object is identified in run-time environment 106, the end user has reached the level or stage within the game and the business rule is applied. The business rule may include logging information about the achievement or advancement and then transmitting it to a centralized repository over a data communication network, such as the Internet, to enable tournaments and merit allocation schemes. Alternatively, in games that display game scores on the screen, the rendered information can be captured and the actual score the user has achieved can be logged and used as the data for enabling tournaments and merit allocation schemes.

C. Displaying Video-Game Controls

In previously-described implementation of the present invention, a business rule is applied as the result of the identification of a particular application-generated graphics or audio object by run-time environment 106. However, in an alternate implementation, the business rule is instead applied in response to the detection of some other event occurring within the context of the executing software application or within the computer system of run-time environment 106.

Figure 10:
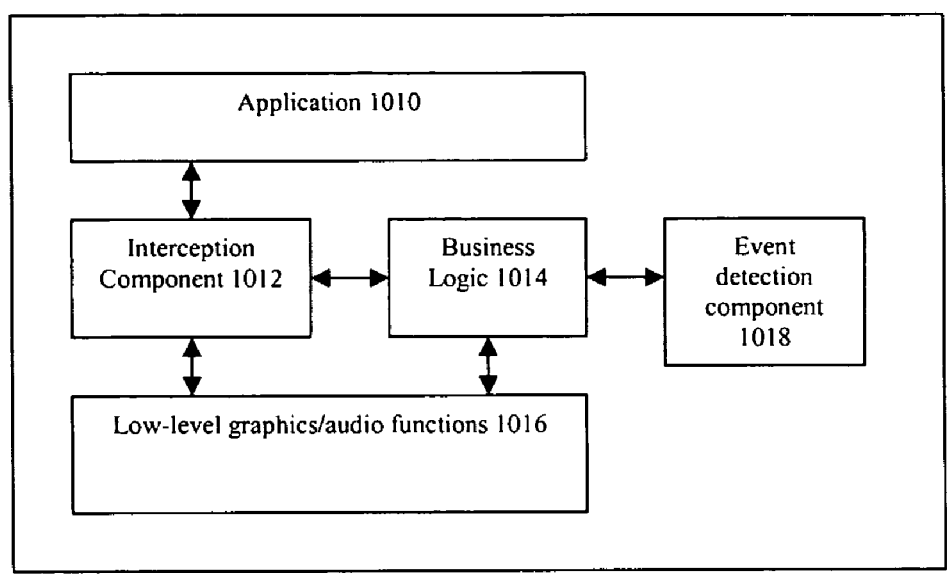
FIG. 10 illustrates an implementation of a run-time environment in accordance with the present invention that includes event detection functionality, logging and reporting such events.

Such an implementation is depicted in FIG. 10. As shown in FIG. 10, the software components of run-time environment 106 include an application 1010, low-level graphics/audio functions 1016, and an interception component 1012 "inserted" between them that is in communication with business logic 1014, similar to the software architecture shown in FIG. 2. However, in the implementation shown in FIG. 10, an additional event detection component 1018 has been provided that allows business logic 1018 to be notified of events occurring within the context of the executing software application or within the computer system of run-time environment 106. In the system shown in FIG. 10, business logic 1014 selectively applies a business rule in response to the detection of such an event.

An example application of such a system includes toggling on or off the display of video game controls within the graphic display associated with a video game, wherein such capability is not provided by the video game itself. In accordance with this example application, event detection component 1018 detects that the user has provided input to the computer system to, such as a combination of keyboard entries, to turn on-screen controls either on or off. In response to detecting this event, business logic 1014 causes the controls to be rendered on the screen if they are being toggled on or causes the controls to not be rendered on the screen if they are being toggled off. The rendering of the controls is achieved by placing function calls to the necessary low-level graphics/audio functions 1016 to perform this task. This functionality enhances usability of the video game by the end user.

The on-screen display of such controls can further be triggered by the identification of certain graphical or audio objects identifying that the user has reached a certain "stage" in the game. Thus, the user can be automatically provided with on-screen controls information upon reaching a new "level", helping him in the game.

D. Trial Messages

Another example application of the system of FIG. 10 involves notifying an end user about the end of a trial period for using application software, wherein the application software is intended for use for a limited time only and/or for a limited number of "levels". In accordance with this example, event detection component 1018 notifies business logic 1014 when a predetermined threshold has been reached with respect to execution of the application. For example, the threshold may be a total amount of time that the application has been used (for example, 1 hour of total use) or the total number of times the application has been launched (for example, 10 sessions). This threshold may mark the actual end of the trial period or only that the end of the trial period is approaching. In any case, in response to such notification, business logic 1014 causes a graphic or audio message to be rendered or played back to the user to alert the user about the end of the trial period. Such a message may be rendered as part of a graphics or audio object generated by the application, or rendered separately from any such object. The message may indicate the amount of time left or sessions left to the user for using the application. The rendering of such a message is achieved by placing function calls to the necessary low-level graphics/audio functions 1016.

In another embodiment of the invention, the interception component may identify a certain object as indicative of reaching a new "stage" or "level", thereby allowing an administrator or other entity to set business rules limiting the use of the application to certain levels or stages. Upon identifying such a new level or stage, the game can be automatically saved (by generating the required key sequences) and an appropriate message can be displayed to the user.

In a further embodiment (not shown) which includes I/O capture capability as described above with reference to FIG. 9, an I/O capture component monitors user input to identify when a user has interacted with a trial message that has been graphically rendered, for example by pointing to the message with a mouse and clicking. In response to a determination that user interaction has occurred, business logic 1014 performs a function. By way of example, the function may include launching a process that allows the end user to procure additional license term for using the application.

E. Parental Controls

A further example application of the system of FIG. 10 allows the dynamic implementation of parental controls that govern the use of a software application. For example, a parent may desire to limit the amount of time that a video game application is played over a given time period, such as a day. In accordance with this example, event detection component 1018 notifies business logic 1014 when the end of the allowed time is approaching. In response to such notification, business logic 1014 causes a graphic or audio message to be rendered or played back to the user to alert the user to the approaching end of the allowed time. Furthermore, when the allowed time has expired, business logic 1014 is notified and causes any progress in the video game to be saved and then exits the application.

As noted elsewhere herein, business rules may also be implemented that cause certain identified graphics or audio objects not to be rendered or played back during execution of a software application. Such an implementation is particularly useful for providing parental controls that selectively block the presentation of certain graphics and/or audio objects content during a video game.

F. On-Screen Communication Messages

In another example application of the system of FIG. 10, event detection component 1018 monitors e-mail clients and/or instant messengers also resident on the computer system of run-time environment 106 and notifies business logic 1014 when information, such as a message, has been received by one of these applications. Business logic 1014 then provides the end user with the message by rendering it within the graphic display associated with application 1010. Business logic 1014 performs this task by accessing low-level graphics/audio functions 1016. Such functionality can be used to allow e-mail and instant messenger messages to be provided to the end user while playing a video game in a seamless and non-intrusive manner. Indeed, such functionality would otherwise be impossible with full screen DirectX® applications.

G. Menu System Recognition and Manipulation

In another implementation of the present invention, menu system recognition and manipulation functionality is provided. For example, in accordance with such an implementation, interception component 212 identifies that an application 210, such as a video game, is rendering graphics associated with a menu system. In response, business logic 214 performs one or more activities. For example, business logic 214 can enable snap-to-menu-item functionality to allow easy navigation within the menu system. Such functionality may include moving the mouse pointer of the end user to the closes menu item. Alternatively or additionally, in an implementation (not shown) that includes I/O capture capability as described above with reference to FIG. 9, by capturing keyboard inputs, the business logic can cause movement between the menu items by translating from analog mouse movement to discrete arrow key-based movement. A further application might include blocking an end user's ability to select certain menu items depending on parental control or licensing-related parameters.

H. Scene Manipulation

In another implementation of the present invention, various manipulations can be performed on a certain scene. For example, some of these manipulations include:

Projection manipulation—The graphic output of the scene, or part of it, can be manipulated to be shown on a different surface than a flat one. For example, when projecting the rendered output, to a spherical shape, there is no need for specific lens to adopt the projection to the surface, but apply a transformation over the Indexes and Vertexes of a selected set within a scene, accordingly. Upon intercepting calls to "BeginScene" and "EndScene" calls, certain business logic may be applied to all calls in between. Future application may further include feedback from the surface itself in a way that the adaptation will be dynamically according to the surface shape.

Objects dimensions and shape—Another example may include stretching or changing scene objects. For example a scene image can become taller, thinner, etc.

Point of View manipulation—Business logic may be provided to enable changing the point of view of an existing scene. For example, in a racing game, the invention can be used to add a point-of-view at the car roof, which was not provided by the game's original functionality. The scene can then be displayed as a picture-in-picture inside the game itself, instead of the original images or on a different screen. In the case the image is displayed on a different screen, one can add interactivity with the manipulated image to allow a viewer to watch the game from various point-of-views without affecting the gamer's user experience.

Lighting manipulation—Business logic is provided to allow for changing lighting definitions. For example, light a dark game or scene.

Shader manipulation—Business logic is provided to allow for changing of the Shaders definitions. For example, this may be used to add or remove fog or change transparency.

V. Example Computer System Implementation

FIG. 11 depicts an example computer system 1100 that may be utilized to implement either staging environment 102 or run-time environment 106. However, the following description of computer system 1100 is provided by way of example only and is not intended to be limiting. Rather, as noted elsewhere herein, staging environment 102 and run-time environment 106 may each comprise a server, a console, a personal digital assistant (PDA), or any other computing device that is capable of executing software applications and displaying associated application-generated graphics and audio information to an end-user.

As shown in FIG. 11, example computer system 1100 includes a processor 1104 for executing software routines. Although a single processor is shown for the sake of clarity, computer system 1100 may also comprise a multi-processor system. Processor 1104 is connected to a communication infrastructure 1106 for communication with other components of computer system 1100. Communication infrastructure 1106 may comprise, for example, a communications bus, cross-bar, or network.

Computer system 1100 further includes a main memory 1108, such as a random access memory (RAM), and a secondary memory 1110. Secondary memory 1110 may include, for example, a hard disk drive 1112 and/or a removable storage drive 1114, which may comprise a floppy disk drive, a magnetic tape drive, an optical disk drive, or the like. Removable storage drive 1114 reads from and/or writes to a removable storage unit 1118 in a well known manner. Removable storage unit 1118 may comprise a floppy disk, magnetic tape, optical disk, or the like, which is read by and written to by removable storage drive 1114. As will be appreciated by persons skilled in the relevant art(s), removable storage unit 1118 includes a computer usable storage medium having stored therein computer software and/or data.

In an alternative implementation, secondary memory 1110 may include other similar means for allowing computer programs or other instructions to be loaded into computer system 1100. Such means can include, for example, a removable storage unit 1122 and an interface 1120. Examples of a removable storage unit 1122 and interface 1120 include a program cartridge and cartridge interface (such as that found in video game console devices), a removable memory chip (such as an EPROM or PROM) and associated socket, and other removable storage units 1122 and interfaces 1120 which allow software and data to be transferred from the removable storage unit 1122 to computer system 1100.

Computer system 1100 also includes at least one communication interface 1124. Communication interface 1124 allows software and data to be transferred between computer system 1100 and external devices via a communication path 1126. In particular, communication interface 1124 permits data to be transferred between computer system 1100 and a data communication network, such as a public data or private data communication network. Examples of communication interface 1124 can include a modem, a network interface (such as Ethernet card), a communication port, and the like. Software and data transferred via communication interface 1124 are in the form of signals which can be electronic, electromagnetic, optical or other signals capable of being received by communication interface 1124. These signals are provided to the communication interface via communication path 1126.

As shown in FIG. 11, computer system 1100 further includes a display interface 1102 which performs operations for rendering images to an associated display 1130 and an audio interface 1132 for performing operations for playing audio content via associated speaker(s) 1134.

As used herein, the term "computer program product" may refer, in part, to removable storage unit 1118, removable storage unit 1122, or a hard disk installed in hard disk drive 1112. A computer useable medium can include magnetic media, optical media, or other recordable media. These computer program products are means for providing software to computer system 1100.

Computer programs (also called computer control logic) are stored in main memory 1108 and/or secondary memory 1110. Computer programs can also be received via communication interface 1124. Such computer programs, when executed, enable the computer system 1100 to perform one or more features of the present invention as discussed herein. In particular, the computer programs, when executed, enable the processor 1104 to perform features of the present invention. Accordingly, such computer programs represent controllers of the computer system 1100.

Software for implementing the present invention may be stored in a computer program product and loaded into computer system 1100 using removable storage drive 1114, hard disk drive 1112, or interface 1120. Alternatively, the computer program product may be downloaded to computer system 1100 over communications path 1126. The software, when executed by the processor 1104, causes the processor 1104 to perform functions of the invention as described herein.

D. CONCLUSION

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for dynamically enhancing a software application, comprising:
   (a) executing the software application on a first computing device;
   (b) intercepting a function call to a graphics or audio application programming interface (API) generated by the software application during execution on the first computing device, wherein the interception is performed by an interception component installed on the first computing device that is not part of the software application or the graphics or audio API;
   (c) determining if a graphics or audio object associated with the function call intercepted in step (b) is associated with a business rule, wherein the determining is performed by business logic installed on the first computing device that is not part of the software application or the graphics or audio API; and
   (d) responsive to a determination that the graphics or audio object is associated with a business rule, applying the business rule by the business logic.

2. The method of claim 1, wherein intercepting a function call to a graphics or audio API comprises emulating the graphics or audio API.

3. The method of claim 1, wherein applying the business rule comprises modifying the graphics or audio object.

4. The method of claim 3, wherein modifying the graphics or audio object comprises altering a portion of the graphics or audio object.

5. The method of claim 4, wherein altering a portion of the graphics or audio object comprises inserting advertising content within the graphics or audio object.

6. The method of claim 3, wherein modifying the graphics or audio object comprises replacing the graphics or audio object with a different graphics or audio object.

7. The method of claim 3, wherein modifying the graphics or audio object comprises not rendering or playing the graphics or audio object.

8. The method of claim 1, wherein applying a business rule comprises:
   rendering or playing the graphics or audio object associated with the function call intercepted in step (b); and
   also rendering or playing one or more additional graphics and/or audio objects that were not originally associated with the function call.

9. The method of claim 8, wherein rendering or playing one or more additional graphics and/or audio objects that were not originally associated with the function call comprises rendering or playing one or more graphics and/or audio objects that represent advertising content.

10. The method of claim 1, wherein applying the business rule comprises rendering advertising content within a graphic display associated with the software application.

11. The method of claim 10, wherein applying the business rule further comprises:
    detecting user interaction with the rendered advertising content; and
    providing additional information to the user responsive to detecting the user interaction.

12. The method of claim 1, wherein applying the business rule comprises:
    logging information relating to the progress of an end user within the software application; and
    transmitting the logged information, or a portion thereof, to a network entity.

13. The method of claim 1, further comprising, prior to step (a):
  (i) executing the software application on a second computing device;
  (ii) intercepting function calls to a graphics or audio API generated by the software application during execution on the second computing device, wherein the interception is performed by an interception component installed on the second computing device that is not part of the software application or the graphics or audio API; and
  (iii) indexing graphics and audio objects associated with the function calls intercepted in step (ii) in a first database, wherein the indexing is performed by an indexing component installed on the second computing device that is not part of the software application or the graphics or audio API;
  (iv) associating business rules with one or more of the graphics and audio objects indexed in step (iii) in a second database; and
  (v) making the second database available to the first computing device;
  wherein step (c) comprises determining if a graphics or audio object associated with the function call intercepted in step (b) is associated with a business rule stored in the second database.

14. The method of claim 13, wherein step (iii) comprises computing a unique identifier (ID) for each of the graphics and audio objects associated with the function calls intercepted in step (ii) and storing each unique ID in the first database, and wherein step (iv) comprises associating business rules with one or more of the unique IDs in the second database.

15. The method of claim 14, wherein computing a unique ID comprises calculating a cyclic redundancy code for each of the graphics and audio objects associated with the function calls intercepted in step (ii).

16. The method of claim 14, wherein computing a unique ID comprises applying an encryption and/or hashing algorithm to each of the graphics and audio objects associated with the function calls intercepted in step (ii).

17. The method of claim 14, wherein step (c) comprises computing a unique ID for the graphics or audio object associated with the function call intercepted in step (b) and determining if the unique ID for the graphics or audio object associated with the function call intercepted in step (b) matches a unique ID stored in the second database.

18. A computer system, comprising:
  a processor; and
  a memory in communication with the processor, the memory storing a plurality of components for execution by the processor, the plurality of components including:
  a software application;
  an interception component to intercept a function call to a graphics or audio application programming interface (API) generated by the software application during execution, wherein the interception component is not part of the software application or the graphics or audio API; and
  business logic to determine if a graphics or audio object associated with the intercepted function call is associated with a business rule and to apply the business rule responsive to a determination that the graphics or audio object is associated with the business rule, wherein the business logic is not part of the software application or the graphics or audio API.

19. The computer system of claim 18, wherein the interception component emulates the graphics or audio API.

20. The computer system of claim 18, wherein the business logic applies the business rule by modifying the graphics or audio object.

21. The computer system of claim 20, wherein the business logic modifies the graphics or audio object by altering a portion of the graphics or audio object.

22. The computer system of claim 21, wherein the business logic alters a portion of the graphics or audio object by inserting advertising content within the graphics or audio object.

23. The computer system of claim 20, wherein the business logic modifies the graphics or audio object by replacing the graphics or audio object with a different graphics or audio object.

24. The computer system of claim 20, wherein the business logic modifies the graphics or audio object by not rendering or playing the graphics or audio object.

25. The computer system of claim 18, wherein the business logic applies the business rule by rendering or playing the graphics or audio object associated with the intercepted function call and by also rendering or playing one or more graphics and/or audio objects that were not originally associated with the intercepted function call.

26. The computer system of claim 18, wherein the business logic applies the business rule by rendering advertising content within a graphic display associated with the software application.

27. The computer system of claim 26, wherein the business logic applies the business rule by detecting user interaction with the rendered advertising content; and providing additional information to the user responsive to detecting the user interaction.

28. The computer system of claim 18, wherein the business logic applies the business rule by: logging information relating to the progress of an end user within the software application; and transmitting the logged information, or a portion thereof, to a network entity.

29. The computer system of claim 18, wherein the business logic determines if a graphics or audio object associated with the intercepted function call is associated with a business rule by: computing a unique identifier (ID) for the graphics or audio object; and comparing the unique ID computed for the graphics or audio object to unique IDs associated with business rules stored in a database.

30. The computer system of claim 29, wherein the business logic computes a unique ID for the graphics or audio object by calculating a cyclic redundancy code for the graphics or audio object.

31. The computer system of claim 29, wherein the business logic computes a unique ID for the graphics or audio object by applying an encryption and/or hashing algorithm to the graphics or audio object.

32. A computer program product comprising a computer usable medium having control logic stored therein, said control logic comprising:
  first computer readable program code means for causing a computer to intercept a function call to a graphics or audio application programming interface (API) generated by a software application during execution;
  second computer readable program code means for causing the computer to determine if a graphics or audio object associated with the intercepted function call is associated with a business rule; and
  third computer readable program code means for causing the computer to apply a business rule responsive to a determination that the graphics or audio object is associated with the business rule, wherein the first computer readable program code means, the second computer readable program code means and the third computer readable program code means do not comprise a part of the software application or the graphics or audio API.

33. The computer program product of claim 32, wherein the means for causing the computer to intercept a function call to a graphics or audio API comprises means for causing the computer to emulate the graphics or audio API.

34. The computer program product of claim 32, wherein the third computer readable program code means comprises means for causing the computer to modify the graphics or audio object.

35. The computer program product of claim 34, wherein the means for causing the computer to modify the graphics or audio object comprises means for causing the computer to alter a portion of the graphics or audio object.

36. The computer program product of claim 35, wherein the means for causing the computer to alter a portion of the graphics or audio object comprises means for causing the computer to insert advertising content within the graphics or audio object.

37. The computer program product of claim 34, wherein the means for causing the computer to modify the graphics or audio object comprises means for causing the computer to replace the graphics or audio object with a different graphics or audio object.

38. The computer program product of claim 34, wherein the means for causing the computer to modify the graphics or audio object comprises means for causing the computer not to render or play the graphics or audio object.

39. The computer program product of claim 32, wherein the third computer readable program code means comprises means for causing the computer to render or play the object associated with the intercepted function call and to also render or play one or more additional graphics and/or audio objects that were not originally associated with the intercepted function call.

40. The computer program product of claim 32, wherein the third computer readable program code means comprises means for causing the computer to render advertising content within a graphic display associated with the software application.

41. The computer program product of claim 40, wherein the third computer readable program code means further comprises means for causing the computer to:
    detect user interaction with the rendered advertising content; and
    provide additional information to a user responsive to detecting the user interaction.

42. The computer program product of claim 32, wherein the third computer readable program code means comprises means for causing the computer to:
    log information relating to the progress of an end user within the software application; and
    transmit the logged information, or a portion thereof, to a network entity.

43. The computer program product of claim 32, wherein the second computer readable program code means comprises means for causing the computer to:
    compute a unique identifier (ID) for the graphics or audio object; and
    compare the unique ID computed for the graphics or audio object to unique IDs associated with business rules stored in a database.

44. The computer program product of claim 43, wherein the means for causing the computer to compute a unique ID for the graphics or audio object comprises means for causing the computer to calculate a cyclic redundancy code for the graphics or audio object.

45. The computer program product of claim 43, wherein the means for causing the computer to compute a unique ID for the graphics or audio object comprises means for causing the computer to apply an encryption and/or hashing algorithm to the graphics or audio object.

* * * * *